(12) United States Patent
Wolf et al.

(10) Patent No.: US 9,669,807 B2
(45) Date of Patent: Jun. 6, 2017

(54) MOTOR VEHICLE WITH VENTILATED WHEEL CASE

(71) Applicant: GM GLOBAL TECHNOLOGY OPERATIONS LLC, Detroit, MI (US)

(72) Inventors: Marc Wolf, Rüsselsheim (DE); Saim Yigit, Rüsselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/967,427

(22) Filed: Dec. 14, 2015

(65) Prior Publication Data

US 2016/0176385 A1    Jun. 23, 2016

(30) Foreign Application Priority Data

Dec. 18, 2014  (DE) ................. 10 2014 018 990

(51) Int. Cl.
*B60T 5/00*     (2006.01)
*F16D 65/847*   (2006.01)
*B62D 35/00*    (2006.01)

(52) U.S. Cl.
CPC .............. *B60T 5/00* (2013.01); *F16D 65/847* (2013.01); *B62D 35/005* (2013.01)

(58) Field of Classification Search
CPC ......... B60T 5/00; B62D 35/00; B62D 35/005; F16D 65/78; F16D 65/847
USPC .............................................. 296/180.1, 208
See application file for complete search history.

(56) References Cited

U.S. PATENT DOCUMENTS

| | | | | |
|---|---|---|---|---|
| 4,772,299 A | * | 9/1988 | Bogusz | B01D 45/04 188/264 AA |
| 4,805,747 A | * | 2/1989 | Moedinger | F16D 65/847 180/68.1 |
| 4,810,021 A | * | 3/1989 | Burst | B60T 5/00 296/180.1 |
| 5,511,847 A | | 4/1996 | Weisbarth et al. | |
| 6,033,010 A | * | 3/2000 | Preiss | B62D 35/005 296/180.1 |
| 6,260,911 B1 | * | 7/2001 | Becker | B62D 35/005 180/903 |
| 6,315,091 B1 | * | 11/2001 | Nilsen | F16D 65/847 188/264 A |
| 7,198,139 B2 | * | 4/2007 | Wilson | F16D 65/78 188/264 AA |
| 2007/0023238 A1 | * | 2/2007 | Ramsay | B60T 5/00 188/71.6 |
| 2012/0068498 A1 | * | 3/2012 | Wolf | B60T 5/00 296/193.1 |
| 2012/0071075 A1 | * | 3/2012 | Wolf | B60T 5/00 454/162 |

(Continued)

FOREIGN PATENT DOCUMENTS

| | | |
|---|---|---|
| DE | 102006044952 A1 | 4/2008 |
| DE | 102012017600 A1 | 3/2014 |
| JP | 2010070151 A | 4/2010 |

*Primary Examiner* — Gregory Blankenship
(74) *Attorney, Agent, or Firm* — Lorenz & Kopf LLP

(57) ABSTRACT

A motor vehicle with a wheel, a wheel case enveloping the wheel, and an air duct leading to the wheel case, wherein the air duct incorporates an adjustable element, which in a first position steers the air entering into the wheel case through the air duct into a gap between an inner flank of the wheel and an inner wall of the wheel case, and in a second position diverts the air by an outer flank of the wheel.

14 Claims, 2 Drawing Sheets

(56) References Cited

U.S. PATENT DOCUMENTS

| | | | |
|---|---|---|---|
| 2013/0233658 A1* | 9/2013 | Carmassi | F16D 65/853 188/264 R |
| 2013/0238198 A1* | 9/2013 | Prentice | B62D 35/02 701/49 |
| 2015/0217734 A1 | 8/2015 | Cheeseman | |
| 2015/0224974 A1* | 8/2015 | Georgin | B60T 17/22 701/32.9 |
| 2015/0232138 A1* | 8/2015 | Parry-Williams | B62D 35/02 296/180.5 |
| 2015/0345578 A1* | 12/2015 | Nightingale | B60K 11/085 188/264 AA |
| 2016/0016617 A1* | 1/2016 | Wolf | B62D 37/02 296/208 |
| 2016/0039469 A1* | 2/2016 | Jachowski | B62D 25/025 296/180.1 |
| 2016/0121859 A1* | 5/2016 | Weber | F16D 65/847 188/264 A |

* cited by examiner

_MOTOR VEHICLE WITH VENTILATED WHEEL CASE_

CROSS-REFERENCE TO RELATED APPLICATION

This application claims priority to German Patent Application No. 102014018990.2, filed. Dec. 18, 2014, which is incorporated herein by reference in its entirety.

TECHNICAL FIELD

The present disclosure pertains to a motor vehicle with a wheel, a wheel case enveloping the wheel, and an air duct leading to the wheel case.

BACKGROUND

DE 10 2006 044 952 A1 describes an air duct in a motor vehicle with an inlet opening on the underbody and an outlet opening in the wheel case, through which air is introduced into the wheel case for cooling a brake. The cross section of the outlet opening extends predominantly in the transverse direction of the vehicle. Air that gets into the wheel case via the air duct when driving is for the most part deflected by the tread of the tire and diverted around the brake enveloped by the tire, and thus only contributes little to cooling the brake. In addition, the introduction of air increases the drag inside of the wheel case, which leads to a deterioration in the aerodynamics of the vehicle.

SUMMARY

Embodiments of the invention improve the cooling of the brake as well as the aerodynamics of the vehicle in the area of the wheel.

In an embodiment of the invention within a motor vehicle with a wheel, a wheel case enveloping the wheel, and an air duct leading to the wheel case, the air duct incorporates an adjustable element, which in a first position steers the air entering into the wheel case through the air duct into a gap between an inner flank of the wheel and an inner wall of the wheel case, and in a second position diverts the air by an outer flank of the wheel.

The air steered into the gap between the inner flank of the wheel and inner wall of the wheel case in the first position of the adjustable element at least partially flows around a brake secured in a recess to the inner flank of the wheel, and is used to effectively cool the latter. If no air is needed for cooling the brake, the air is diverted past the outer flank of the wheel in largely the vehicle direction in the second position of the adjustable element, and there forms an air curtain. This air curtain diminishes the air turbulence arising inside of the wheel case due to the rotational movement of the wheel, and thereby improves the aerodynamics in the area of the wheel.

The air duct can exhibit a closed cross section.

An inlet opening of the air duct can lie in the front of the vehicle. As a result, the dynamic pressure that builds up ahead of the driving vehicle at the front can be partially diverted.

Therefore, it would also be possible to utilize the dynamic pressure and forego the adjustable element, so that the outflowing air always cools the brake, and simultaneously forms an air curtain. The unfavorable effects on the aerodynamics caused by steering air into the wheel case are then at least partially diminished by the formed air curtain.

The air duct can branch into a brake air duct, through which the air flows into the gap, and a side air duct, through which the air flows by the outer flank of the wheel.

The air flow exiting the brake air duct can be directed against the inner flank of the wheel. This results in an effective cooling of the brake secured in the recess to the inner flank of the wheel.

An outlet opening of the brake air duct in the wheel case can for the most part lie on the side of a plane facing the middle of the vehicle, which is perpendicular to the wheel axle during straight line travel, and touches the inner flank of the wheel. As a result, the air is steered in a targeted manner into the gap between the inner flank of the wheel and the inner wall of the wheel case, and an increase in the air circulating on the tread of the wheel that is unproductive in terms of cooling the brake is largely prevented.

An outlet opening of the side air duct can lie in proximity to the outer flank of the wheel.

The expansion of an outlet opening of the side air duct can be greater in the vertical than in the transverse direction of the vehicle. As a consequence, an expanded air flow can be generated in the vertical to form an air curtain that is closed over a large portion of the vertical expansion of the wheel case.

The adjustable element can be positioned between the brake air duct and side air duct. The brake air duct can be open and the side air duct can be closed in the first position, while the side air duct can be open and the brake air duct can be closed in the second position.

An actuator can bring the adjustable element into the first position given a delay of the vehicle.

A control circuit can be provided for activating the actuator. The control circuit is advantageously connected with the brake or a braking system allocated to the brake, so as to control the actuator depending on brake activity.

The amount of air that must be supplied through the brake air duct to sufficiently cool the brake depends on the intensity of a braking process. Therefore, the control circuit can be set up to determine the duration for which the adjustable element remains in the first position after a braking process has concluded as a function of the intensity of the braking process.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
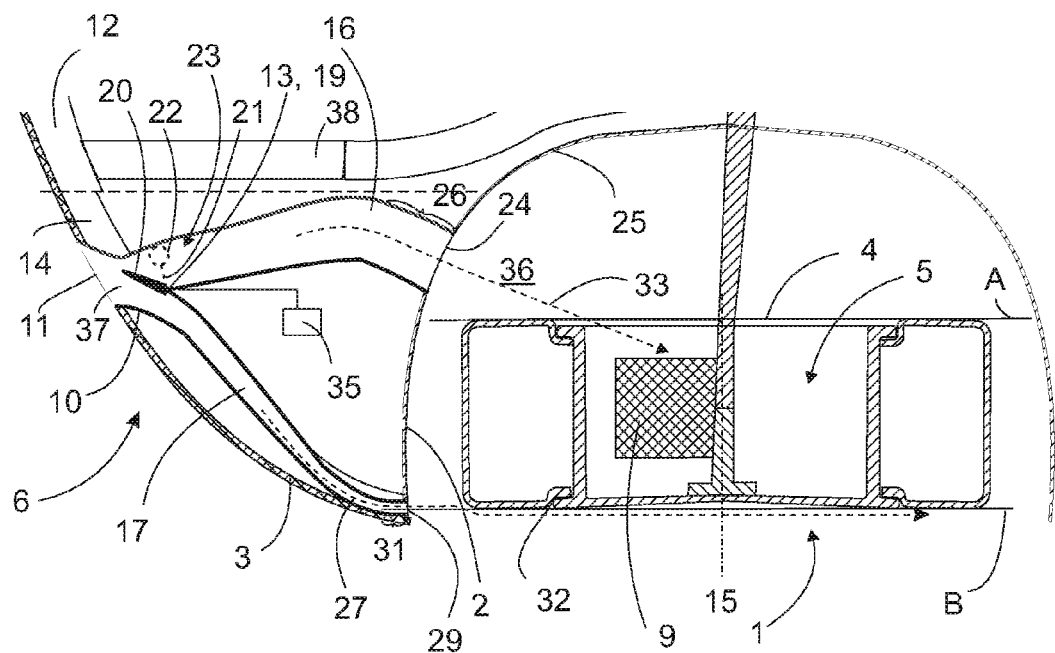
FIG. 1 is a schematic cross section through the anterior left front area of a motor vehicle.
Figure 2:
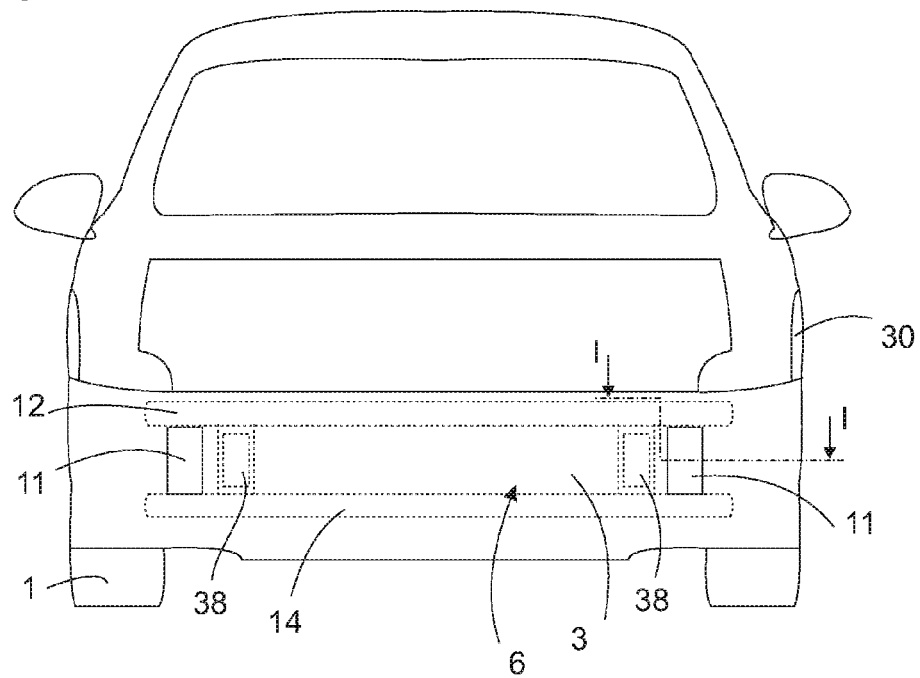
FIG. 2 is a view of the vehicle front.

In a schematic cross section along the cutting plane I-I on FIG. 2 through the anterior left front area of a motor vehicle, FIG. 1 shows a front wheel 1 in a wheel case 2 and a bumper cover 3 situated ahead of that in the traveling direction. An inner flank 4 of the wheel 1 exhibits a recess 5, in which a brake 9 that acts on the wheel 1 is secured.

As depicted in a view of the vehicle front 6, an air duct 10 extends from the inlet opening 11 in the bumper cover 3 between an upper bumper crossbeam 12 and a lower bumper crossbeam 14 in the direction of the Wheel case 2. The upper and lower bumper crossbeams 12, 14 are joined by side members with a bearing structure for the front section. On FIG. 2, the upper and lower bumper crossbeams 12, 14 are concealed by the bumper cover 3, and thus denoted by dashed lines. If a radiator grille takes up part of the vehicle front, the inlet opening 11 can also lie in the radiator grille instead of in the bumper cover.

As shown on FIG. 1, a front section 37 of the air duct 10 extends between the inlet opening 11 and a junction 13, where the air duct 10 branches into a brake air duct 16 and a side air duct 17.

The brake air duct 16 extends between the junction 13 and an outlet opening 24. This outlet opening 24 lies in the wheel case 2, for the most part on the side of a plane A facing the middle of the vehicle, which lies perpendicular to the wheel axle 15 and touches the inner flank 4 of the wheel 1.

The side air duct 17 extends between the junction 13 and an outlet opening 29. This outlet opening 29 lies at the outer edge of the wheel case 2, adjacent to a front fender 30.

The front section 37, brake air duct 16 and side air duct 17 are each comprised of tubular molded components made out of plastic with a cross section that is closed all around.

Figure 3:
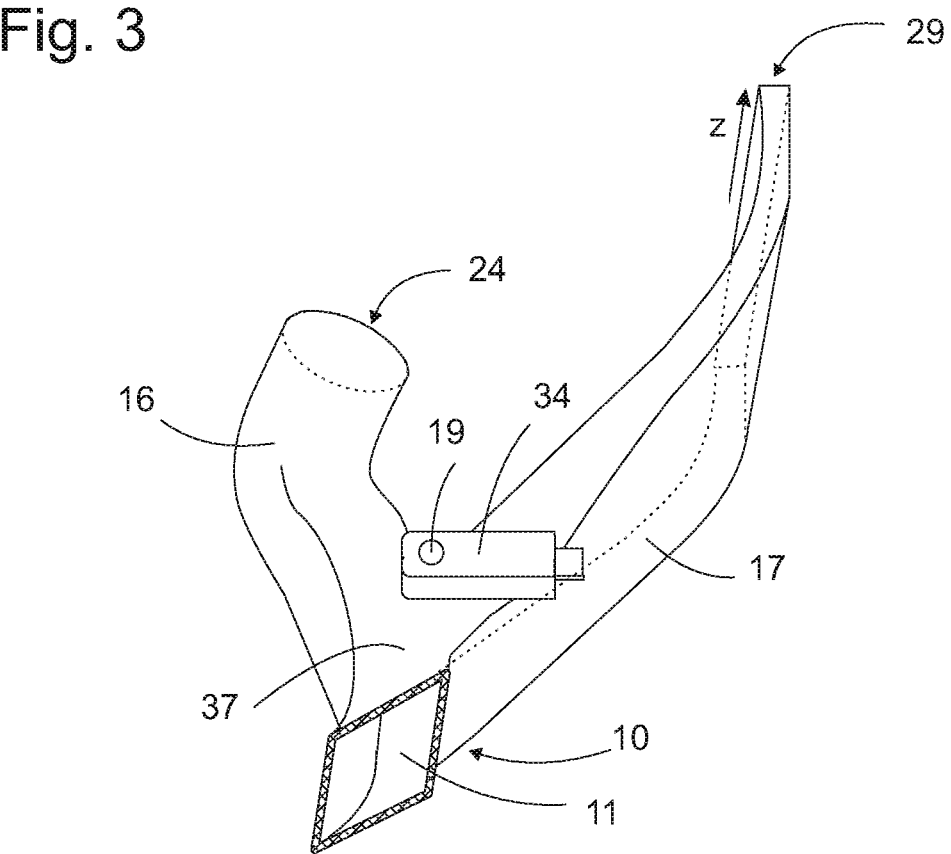
FIG. 3 is a perspective view of the air duct.

FIG. 3 shows a perspective view of the air duct 10. The outlet opening 29 is elongated like a slit in the vertical, so as to generate an air curtain, which covers the open side of the wheel case 2 as completely as possible.

An adjustable element is secured to the junction 13 in the form of a flap 20 that can be swiveled around an axis 19. In a first position, the flap 20 seals the side air duct 17 and releases the brake air duct 16. In a second position, the flap 20 seals the brake air duct 16 and releases the side air duct 17. A lever arm 21 of a mechanical actuator 23 (denoted by dashed lines on FIG. 1) is secured to the axis 19 of the flap 20 above the junction 13. The lever arm 21 is aligned in such a way as to run in about the transverse direction of the vehicle in the second position of the flap 20. The end of the lever arm 21 carries a weight 22.

If the vehicle is moving forward, air flows through the inlet opening and into the air duct 10. If the vehicle is traveling without the brakes applied, the flap 20 is in the second position, and an air flow 27 (denoted by a dashed arrow) streams through the side air duct 17. As shown on FIG. 1, the longitudinal axis of a section 31 of the side air duct 17 located directly in front of the outlet opening 29 runs along a plane B lying perpendicular to the wheel axle 15 in the straight ahead traveling position, and touches the outer flank 32 of the wheel 1. The air flow 27 is in this way largely diverted along the outer flank 32 of the wheel 1. It forms an expanded air curtain that is closed over a large part of the vertical expansion of the wheel case, diminishing turbulences in the area of the wheel 1 and improving the aerodynamics.

In the braking process, the inertia of the weight 22 of the actuator 23 exerts a force on the lever arm 21 in the traveling direction, so that the latter swivels and moves the flap 20 into the first position. Caused by the location of the outlet opening 24, an air flow 33 (denoted by a dashed arrow) through the brake air duct 16 is steered into a gap 36 between the inner flank 4 of the wheel 1 and an inner wall 25 of the wheel case 2. In order to steer this air flow 33 into the recess 5 of the wheel 1 and onto the brake 9 to the greatest extent possible, the longitudinal axis of a section 26 of the brake air duct 16 situated directly in front of the outlet opening 24 runs in the direction toward the brake 9. The air flow 33 streaming toward the brake 9 serves to cool the brake 9. However, it also leads to air turbulences in the wheel case 2, which detract from the aerodynamics, A restoring element, for example a spring secured to the axis 19, thus brings the flap 20 back to the second position after the braking process has ended, and the force of the weight 22 associated therewith has been eliminated. This ensures that the brake 9 is cooled while braking on the one hand, while minimizing the deterioration of aerodynamics associated therewith. The process of returning the flap 20 to the second position can be supported by the pressure exerted by the air flowing in through the inlet opening 11.

Instead of the inertia-controlled mechanical actuator 23, the second embodiment on FIG. 3 shows an actuator 34 designed as an electric motor. The actuator 34 is connected with a control circuit 35. The control circuit 35 receives information about a braking process from a brake sensor. The brake sensor can be part of a braking system of the motor vehicle known in the art, e.g., a pressure sensor, which detects the hydrostatic pressure of a brake fluid circulating in the braking system. If a braking process is initiated, the control circuit 35 activates the actuator 34, and the latter brings the flap 20 into the first position.

The control circuit 35 is set up to determine the time for which the flap 20 is retained in the first position based on the intensity of the braking process and, when necessary, to keep the flap 20 in the first position for a bit longer even after the braking process has concluded. For example, the vehicle speed, brake fluid pressure while braking and duration of the braking process can be used to estimate the heat quantity released in the brakes 9, and determine the time for which the flap 20 is retained in the first position proportionately to this heat quantity. At the end of the retention time, the actuator 34 is activated by the control circuit 35, and brings the flap 20 into the second position. In the driving mode, the flap 20 then remains in this position until the next braking process, and the air steams through the side air duct 17 to form the aerodynamically advantageous air curtain.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle, comprising:
a wheel,
a wheel case enveloping the wheel, and
an air duct having a forward portion extending from an inlet opening to a junction, a first duct portion extending from the forward portion at the junction to the wheel case, and a second duct portion extending from the forward portion at the junction to the wheel case,
an adjustable element positioned within the air duct, the adjustable element having a leading edge extending into the forward portion and a trailing edge secured to the junction such that the adjustable element is pivotable about the trailing edge between a first position in which the air from the forward portion is directed through the first duct portion into a gap between an inner flank of the wheel and an inner wall of the wheel case, and a second position in which the air from the forward portion is directed through the second duct portion onto an outer flank of the wheel.

2. The motor vehicle according to claim 1, with a brake that is secured in a recess to the inner flank of the wheel.

3. The motor vehicle according to claim 1, in which the air duct exhibits a closed cross section.

4. The motor vehicle according to claim 1, in which the inlet opening of the air duct lies in the front of the vehicle.

5. The motor vehicle according to claim 1, wherein the first duct portion is a brake air duct, through which the air flows into the gap, and the second portion is a side air duct, through which the air flows by the outer flank of the wheel.

6. The motor vehicle according to claim 5, in which the air flow exiting the brake air duct is directed against the inner flank of the wheel.

7. The motor vehicle according to one of claim 5, in which an outlet opening of the brake air duct in the wheel case for the most part lies on the side of a plane facing the middle of the vehicle, which is perpendicular to the wheel axle and touches the inner flank of the wheel.

8. The motor vehicle according to one of claim 5, in which an outlet opening of the side air duct lies in proximity to the outer flank of the wheel.

9. The motor vehicle according to one of claim 5, in which the expansion of an outlet opening of the side air duct is greater in the vehicle height than in the transverse direction of the vehicle.

10. The motor vehicle according to one of claim 5, in which the adjustable element is positioned between the brake air duct and side air duct.

11. The motor vehicle according to claim 1, with an actuator, which brings the adjustable element into the first position given a delay of the vehicle.

12. The motor vehicle according to claim 11, with a control circuit for activating the actuator.

13. The motor vehicle according to claim 12, in which the control circuit is set up to determine the duration for which the adjustable element remains in the first position after a braking process has concluded as a function of the intensity of the braking process.

14. The motor vehicle according to claim 1, further comprising an actuator configured to selectively position the adjustable element into the first and second positions, wherein the adjustable element has a weight such that inertia of the actuator in a traveling direction during a braking process forces the adjustable element into the first position.

* * * * *